United States Patent
Vest

(10) Patent No.: US 10,082,036 B2
(45) Date of Patent: Sep. 25, 2018

(54) VANE RING BAND WITH NANO-COATING

(71) Applicant: Rolls-Royce Corporation, Indianapolis, IN (US)

(72) Inventor: Wade A. Vest, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 312 days.

(21) Appl. No.: 14/843,689

(22) Filed: Sep. 2, 2015

(65) Prior Publication Data
US 2016/0084097 A1 Mar. 24, 2016

Related U.S. Application Data

(60) Provisional application No. 62/054,107, filed on Sep. 23, 2014.

(51) Int. Cl.
*F01D 9/04* (2006.01)
*F01D 17/14* (2006.01)
(Continued)

(52) U.S. Cl.
CPC ............... *F01D 9/042* (2013.01); *B22C 9/10* (2013.01); *B22D 29/003* (2013.01); *B29C 33/3842* (2013.01); *B29C 45/0055* (2013.01); *B29C 45/17* (2013.01); *F01D 5/288* (2013.01); *F01D 9/041* (2013.01); *F01D 17/14* (2013.01); *F01D 17/162* (2013.01); *B29C 2045/0058* (2013.01); *B29C 2045/0079* (2013.01); *B29K 2101/00* (2013.01); *B29L 2031/7504* (2013.01); *F05D 2220/32* (2013.01); *F05D 2230/21* (2013.01); *F05D 2230/90* (2013.01); *F05D 2240/12* (2013.01); *F05D 2240/80* (2013.01); *F05D 2300/10* (2013.01); *F05D 2300/43* (2013.01);
(Continued)

(58) Field of Classification Search
CPC .......... F01D 9/042; F01D 9/041; F01D 5/288; F01D 17/14; F01D 17/162; B22C 9/10; B22D 29/003; B29C 33/3842; B29C 45/0055; B29C 45/17; B29C 2045/0058; B29C 2045/0079; B29K 2101/00; B29L 2031/7504; F05D 2220/32; F05D 2230/21; F05D 2230/90; F05D 2240/12; F05D 2240/80; F05D 2300/10; F05D 2300/43; F05D 2300/609; F05D 2300/611
USPC ............... 415/160, 209.3; 156/242; 164/132; 264/129
See application file for complete search history.

(56) References Cited

U.S. PATENT DOCUMENTS

| | | | |
|---|---|---|---|
| 307,897 A * | 11/1884 | Varadi et al. ............ | B65D 5/22 229/151 |
| 4,365,933 A | 12/1982 | Langer et al. | |

(Continued)

FOREIGN PATENT DOCUMENTS

WO    2010025339 A1    3/2010

OTHER PUBLICATIONS

Extended European Search Report, European Patent Application No. 15186361.0-1610, Feb. 17, 2016, 9 pages.

*Primary Examiner* — Laert Dounis
*Assistant Examiner* — Kelsey Stanek
(74) *Attorney, Agent, or Firm* — Barnes & Thornburg LLP

(57) ABSTRACT

An inner band used on a turbine engine is disclosed herein. The inner band may include a core comprising polymeric materials and a shell comprising nanocrystalline metallic materials applied to the core to cover at least a portion of the core.

15 Claims, 5 Drawing Sheets

(51) Int. Cl.
  *B29C 33/38* (2006.01)
  *B29C 45/00* (2006.01)
  *B29C 45/17* (2006.01)
  *B22C 9/10* (2006.01)
  *B22D 29/00* (2006.01)
  *F01D 5/28* (2006.01)
  *F01D 17/16* (2006.01)
  *B29K 101/00* (2006.01)
  *B29L 31/00* (2006.01)

(52) U.S. Cl.
  CPC .. *F05D 2300/609* (2013.01); *F05D 2300/611* (2013.01)

(56) References Cited

U.S. PATENT DOCUMENTS

| | | |
|---|---|---|
| 6,884,030 B2 | 4/2005 | Darkins, Jr. et al. |
| 7,114,917 B2 | 10/2006 | Legg |
| 7,905,448 B2 | 3/2011 | Sjunnesson et al. |
| 8,292,580 B2 | 10/2012 | Schiavo et al. |
| 8,636,466 B2 | 1/2014 | Cortequisse |
| 2010/0055455 A1* | 3/2010 | Dauer ............... C08K 3/04 428/338 |
| 2010/0304171 A1 | 12/2010 | Tomantschger et al. |
| 2012/0082553 A1* | 4/2012 | Eleftheriou ......... F01D 5/147 416/224 |
| 2012/0301285 A1 | 11/2012 | Suciu et al. |
| 2012/0301312 A1 | 11/2012 | Berczik et al. |
| 2013/0224008 A1 | 8/2013 | Cheung et al. |

\* cited by examiner

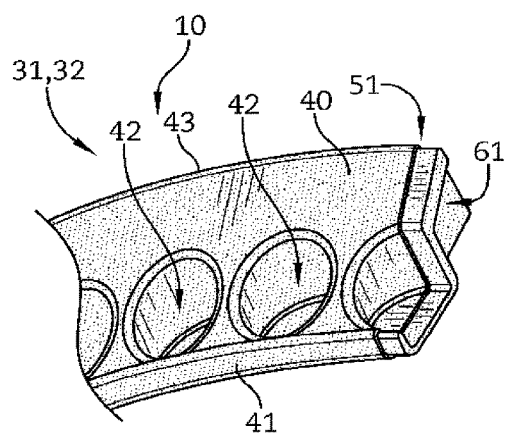
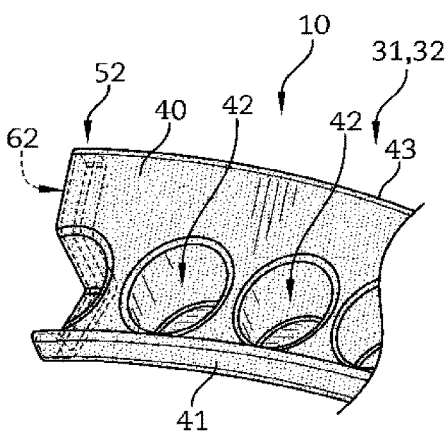
FIG. 4A
FIG. 4B
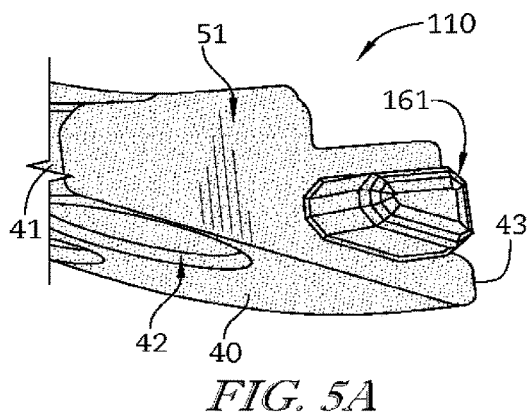
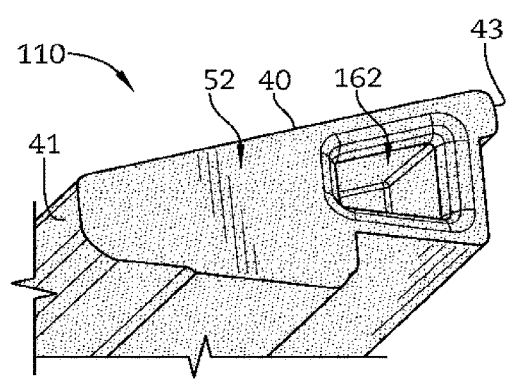
FIG. 5A
FIG. 5B

VANE RING BAND WITH NANO-COATING

CROSS REFERENCE TO RELATED APPLICATIONS

This application claims priority to and the benefit of U.S. Provisional Patent Application No. 62/054,107, filed 23 Sep. 2014, the disclosure of which is now expressly incorporated herein by reference.

FIELD OF THE DISCLOSURE

The present disclosure relates generally to gas turbine engines, and more specifically to bands upon which movable vanes are mounted in gas turbine engines.

BACKGROUND

Gas turbine engines typically include vanes that redirect air moving through the engine. Sometimes vanes are movable to change the direction of air passing over the vanes and to create a variable area which affects the air's flow path. Such vanes are sometimes mounted to one or more bands to pivot relative to the bands. These bands may also aid in creating a constant flow path radially inward and/or outward of the vanes during use in a gas turbine engine.

Corrosion resistant materials, such as aluminum and steel alloys, are sometimes used to make the bands upon which movable vanes are mounted. These bands may be machined from a forging or casting which can require significant time and cost.

SUMMARY

The present disclosure may comprise one or more of the following features and combinations thereof.

A band for supporting a variable position vane within a gas turbine engine is disclosed herein. The band may include a core comprising polymeric materials and a shell comprising nanocrystalline metallic materials applied to the core to cover substantially all of an outer surface of the core.

In some embodiments, the polymeric material comprised by the core may be selected from the group consisting of polyether ether ketone, acrylonitrile butadiene styrene, polyethylenimine, and Nylon GF.

In some embodiments, the nanocrystalline material comprised by the shell may be a nickel-based alloy. Grains of the nanocrystalline material may have a grain size of about 5 nanometers or less. The shell may have a thickness from about 0.001-0.150 inches at all points along the exterior surface of the core.

In some embodiments, the band is arcuate and extends at least partway around a central axis. In some such embodiments, a thickness of the shell may be greater along a radially-outward facing flow path surface of the band than along other surfaces of the band.

In some embodiments, the band may be formed to include a plurality of holes that extend inward in a radial direction from the radially-outward facing flow path surface toward the central axis. The holes may be blind holes that extend partway through the band.

According to another aspect of the present disclosure, a band may include a shell that forms at least a portion of an arc around a central axis and that defines an internal cavity. The band may be formed to include a plurality of blind holes that extend inward in a radial direction from a radially-outward facing flow path surface toward the central axis.

The shell may be made of nanocrystalline metallic materials having a grain size of about 5 nanometers or less.

In some embodiments, the band may include reinforcement pins that extend through the internal cavity. The reinforcement pins may comprise nanocrystalline metallic materials having a grain size of about 5 nanometers or less.

In some embodiments, the internal cavity may be hollow. In some embodiments, the thickness of the shell may be greater along the radially-outward facing flow path surface of the band than along other surfaces of the band.

According to another aspect of the present disclosure, a method of making a band for supporting a variable position vane within gas turbine engine is taught. The method may include molding a first polymeric core having an arcuate shape that extends around a central axis, and coating the first polymeric core with nanocrystalline metallic materials to form a shell over the first polymeric core, the nanocrystalline metallic materials having a grain size of about 5 nanometers or less.

In some embodiments, the method may include assembling a second polymeric core to the first polymeric core before coating the first and the second polymeric core so that the shell is formed over both the first and the second polymeric core.

In some embodiments, the method may include removing the first polymeric core after the shell is formed to create a hollow internal cavity defined by the shell. Removing the first polymeric core may be accomplished by heating the polymeric core and the shell.

In some embodiments, the method may include forming holes in the first polymeric core that extend through the first polymeric core so that reinforcement pins comprising nanocrystalline metallic materials are created during coating of the first polymeric core with nanocrystalline metallic materials to form the shell. The method may include removing the first polymeric core after the shell is formed to create an internal cavity defined by the shell through which the reinforcement pins extend.

In some embodiments of the method, a thickness of the shell may be greater along a radially-outward facing flow path surface of the band than along other surfaces of the polymeric core.

These and other features of the present disclosure will become more apparent from the following description of the illustrative embodiments.

BRIEF DESCRIPTION OF THE DRAWINGS

FIG. 3B is a cross sectional view of yet another alternative inner band similar to the inner band of FIGS. 2, 3, and 3A showing that in some embodiments, reinforcement pins comprising nanocrystalline metallic materials may be formed with the core to extend through an interior cavity and that a polymeric core may be removed from the shell to form a partially hollow interior cavity;

Figure 2:
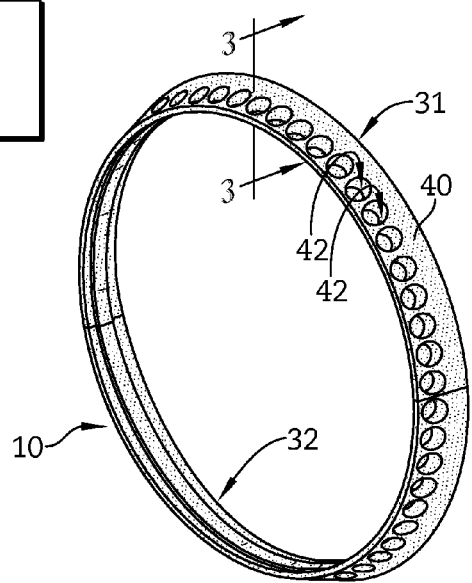
FIG. 2 is a perspective view of the inner band of FIG. 1 showing that the inner band forms a ring about a central axis and that the inner band includes blind holes that extend inwardly in a radial direction from a radially-outward facing flow path surface toward the central axis.
Figure 3:
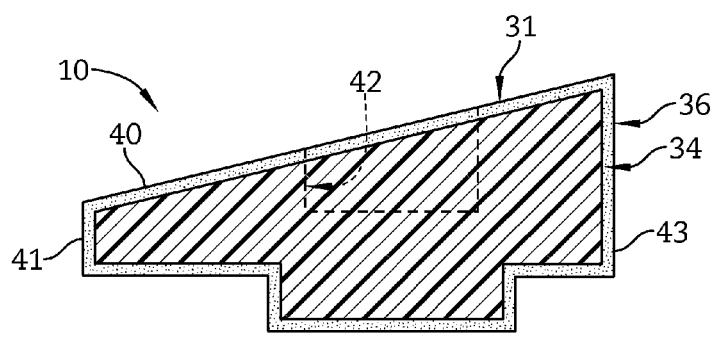
FIG. 3 is a cross sectional view of the inner band of FIG. 2 showing that the inner band includes a core comprising polymeric materials and a shell comprising nanocrystalline metallic materials applied to the core to cover substantially all of an outer surface of the core.
Figure 3A:
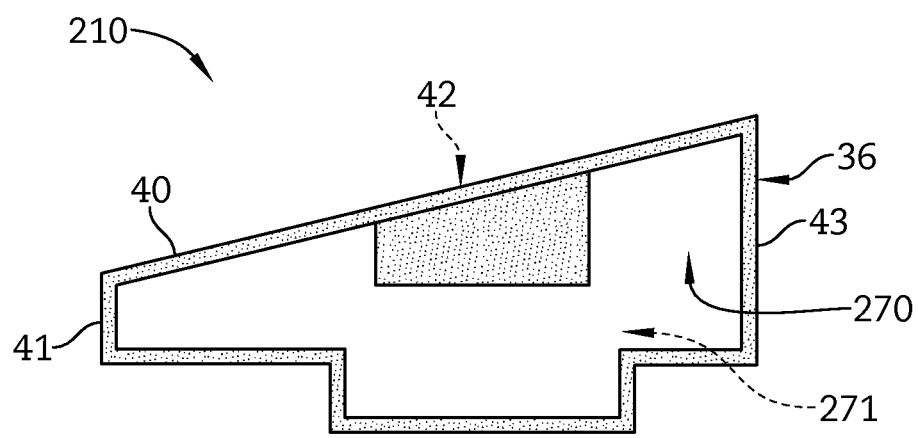
FIG. 3A is a cross sectional view of an alternative inner band similar to the inner band of FIGS. 2 and 3 showing that, in some embodiments, a polymeric core may be removed from the shell to form a hollow interior cavity.
Figure 3B:
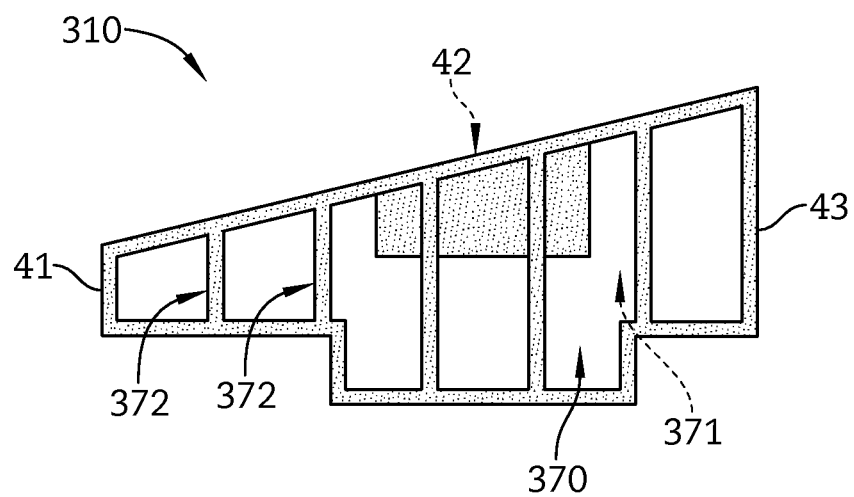
Figure 6:
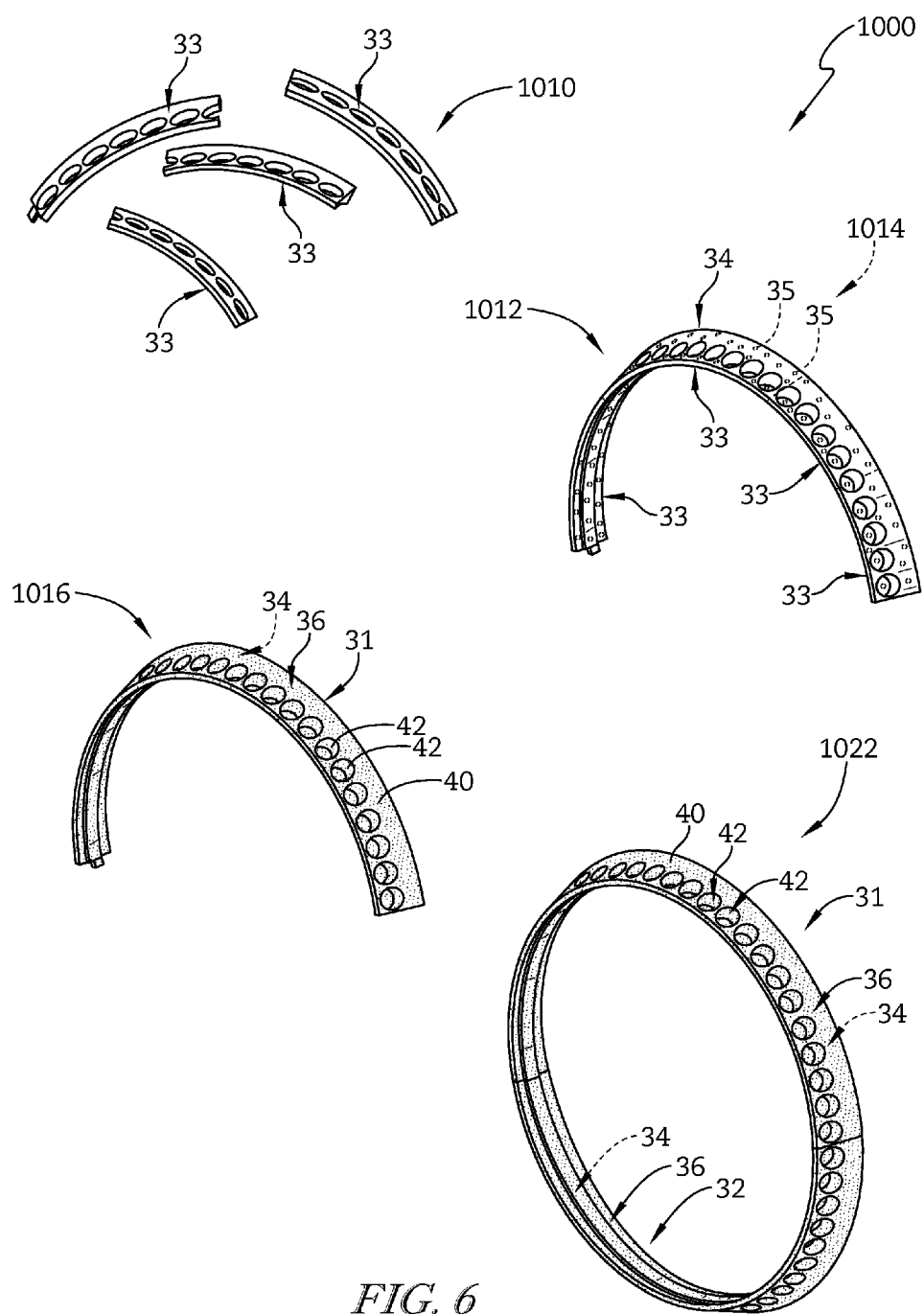
Figure 7:
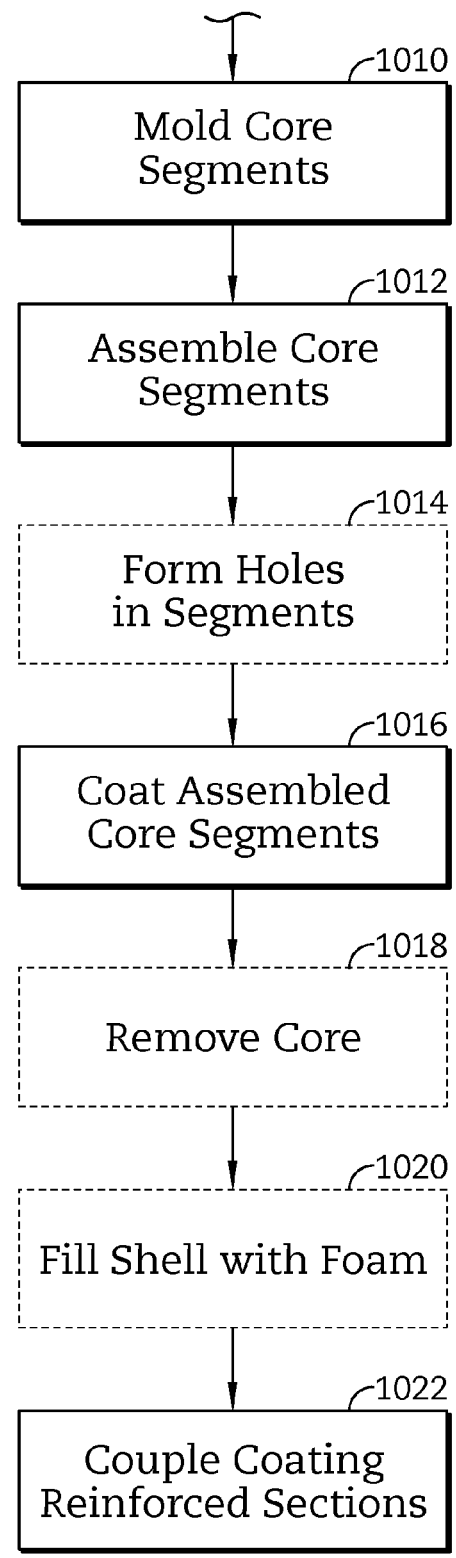

FIG. 4A is a perspective view of a first end of a first section of the inner band showing that the first end is formed to provide a male coupling feature for attaching the first section of the inner band to other sections of the inner band;

FIG. 4B is a perspective view of a second end of a second section of the inner band adapted for use with the first section shown in FIG. 4A showing that the second end is formed to provide a female coupling feature for attaching the second section of the inner band to other sections of the inner band;

FIG. 5A is a perspective view of an alternative first end of a first section of the inner band showing that, in some embodiments, the first end is formed to provide a male coupling feature for attaching the first section of the inner band to other sections of the inner band;

FIG. 5B is a perspective view of a second end of an alternative second section of the inner band adapted for use with the first section shown in FIG. 5A showing that, in some embodiments, the second end is formed to provide a female coupling feature for attaching the second section of the inner band to other sections of the inner band;

FIG. 6 is a series of perspective views showing a method for making the inner band of FIGS. 2-3; and FIG. 7 is a diagrammatic view of the method for making the inner band of FIGS. 2-3 and showing in phantom additional steps for making the inner band of FIGS. 3A and 3B.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
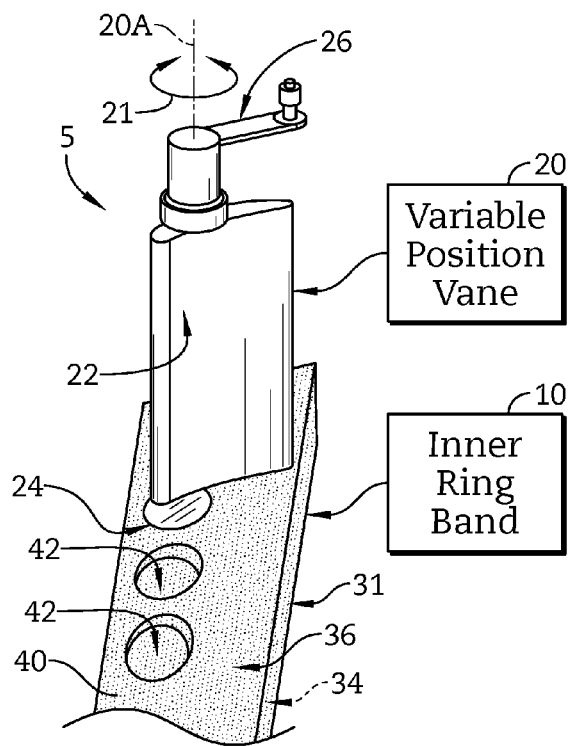
FIG. 1 is a perspective view of a portion of a vane assembly for a gas turbine engine showing that the assembly includes an inner band supporting a variable position vane.

A portion of a vane assembly 5 for a gas turbine engine is shown in FIG. 1. The vane assembly 5 illustratively includes an inner band 10 and a variable position vane 20 mounted to the inner band 10. The inner band 10 supports the vane 20 so that the vane 20 can pivot about an axis 20A as suggested by arrow 21. Movement of the vane 20, along with other vanes included in the entire vane assembly 5, allow the vane 20 to change the direction of air passing over the vane 20 and to create a variable area between adjacent vanes which affects the air's flow path.

The inner band 10 forms a ring about a central axis 11 and illustratively includes first and second arcuate sections 31, 32 as shown in FIG. 2. In other embodiments, more or fewer sections may make up the full ring inner band 10. In one particular embodiment, the inner band 10 may be a one-piece integral full hoop band. Each section 31, 32 of inner band 10 includes a core 34 and a shell 36 as shown in cross sectional FIG. 3. The shell 36 is illustratively made up of a coating applied to substantially all outer surfaces of the core 34 to reinforce the core 34.

The core 34, sometimes called a body or body core, comprises polymeric materials as shown in FIG. 3. The core 34 is illustratively an injection molded part but may be manufactured in other ways. In the illustrative embodiment, the polymeric material comprised by the core 34 is selected from the group consisting of polyether ether ketone, acrylonitrile butadiene styrene, polyethylenimine, and Nylon GF. In other embodiments, other polymeric or non-polymeric materials, such as foams, may make up the core 34.

The shell 36, sometimes called a coating, comprises nanocrystalline metallic materials as shown in FIG. 3. In the illustrative embodiment, the nanocrystalline material comprises by the shell 36 is a nickel-based alloy. Grains of the nanocrystalline material in the illustrative embodiment have a grain size of about 5 nanometers or less. Examples of such a nanocrystalline material may include NANOVATE N1210, N1010, N2020, and N2025 available from Integran Technologies Inc. The coating or shell 36 is a structural plating applied onto the polymer core 34. It is appreciated that the combination of the polymer and the coating may create a part that has similar material strengths to fully metallic parts. In other embodiments, the shell 36 may be made up of other materials and/or may have other grain sizes.

The shell 36 illustratively has a substantially constant thickness from about 0.001-0.150 inches at all points along the exterior surface of the core 34 as shown in FIG. 3. In some embodiments, the shell 36 may have a thickness that is greater along a radially-outward facing flow path surface 40 of the band 10 than along other surfaces of the band 10 to resist damage from objects that may impact the band 10.

In the illustrative embodiment, the radially-outward facing flow path surface 40 of the band 10 extends axially along the axis 11 and radially away from the axis 11 from a forward side 41 to an aft side 43 of the band 10 as shown in FIG. 3. The band 10 is formed to include a plurality of holes 42 that extend inward in a radial direction from the radially-outward facing flow path surface 40 toward the central axis 11. The holes 42 are illustratively blind holes that extend partway through the band 10 but may be through holes in other embodiments.

The vanes 20 included in the assembly 5 are received in the holes 42 to pivot about axes 21 perpendicular to the central axis 11 as suggested in FIG. 1. Each vane 20 includes an airfoil 22, a pivot hub 24 that extends radially inward from the airfoil 22, and an actuation arm 26 that extends radially outward from the airfoil 22. The pivot hub 24 is substantially cylindrical in shape and is received in one of the holes 42 formed in the band 10 to pivot within the hole 42. In some embodiments, the shell 36 may have a thickness that is greater holes 42 formed in the band 10 than along other surfaces of the band 10 to resist rub damage from vanes 20. The actuation arms 26 may be attached to a pivot ring that is rotated to pivot the vanes 20 in a coordinated fashion.

Each section 31, 32 of the inner band 10 illustratively has a first end 51, a second end 52, and a central portion 53 as shown in FIGS. 4A and 4B. The first end 51 is formed to provide a male coupling feature 61 while the second end 52 is formed to include a complementary female coupling feature 62. The coupling features 61, 62 illustratively extend from adjacent the forward side 41 to adjacent the aft side 43 of the band 10. In another embodiment, a band 110 is substantially similar to band 10 except that the first end 51 has a male coupling feature 161 with a polygonal shape arranged adjacent only to aft side 43 of the band 110 and a female coupling feature 162 with a corresponding polygonal shape arranged adjacent only to aft side 43 of the band 110 as shown in FIGS. 5A and 5B.

An alternative inner band 210, similar to the inner band 10, of FIGS. 2 and 3 is shown in FIG. 3A. The inner band 210 is unlike inner band 10 in that inner band 210 includes a hollow inner cavity 270 formed when a core 34 was removed from a shell 36. In some embodiments, inner cavity 270 may be filled with a foam filler 271 after removal of the core 34.

Yet another alternative inner band 310, similar to the inner band 10, of FIGS. 2 and 3 is shown in FIG. 3B. The inner band 310 is unlike inner band 10 in that inner band 310 includes a partly hollow inner cavity 370 formed when a core 34 was removed from a shell 36 and reinforcement pins 372 that extend through partly hollow inner cavity 370. Reinforcement pins 372 comprise nanocrystalline metallic material formed with the shell 36, illustratively a nickel-based alloy, with grains size of about 5 nanometers or less formed with shell 36. However, in some embodiments, the reinforcement pins may be made of other metallic materials. In some embodiments, inner cavity 370 may be filled with a foam filler 371 after removal of the core 34.

The nano-coating shell 36 disclosed herein creates a corrosion and impact resistant protection for the polymer core 34. The nano-coating shell 36 may also provide the bands 10, 110, 210, 310 greater strength than previously known bands. A performance gain might be possible with variable bands 10, since the formation process may eliminate gaps, and the polymer material of has a lower growth rate. Because of this, it might also be possible to produce the seals for band 10 with tighter clearances.

In certain applications, bands 10, 110, 210, 310 may be rubbed by an adjacent rotor. The nano-coating shell 36 of bands 10, 110, 210, 310 may be harder than previously used materials that form bands such that damage from rubbing by rotors is reduced.

A series of perspective views showing a method 1000 for making the inner band of FIGS. 2-3 is shown in FIG. 6; and, a diagrammatic view of the method 1000 for making the inner band of FIGS. 2-3 is shown in FIG. 7. FIG. 7 also includes additional steps for making the inner bands of FIGS. 3A and 3B.

In a first step 1010 of the method 1000, segments 33 of core 34 are formed by injection molding polymeric materials as suggested in FIGS. 6 and 7. In a step 1012, the segments 33 are assembled together by adhesives, melt welding, or other means before being coated with nanocrystalline material to form sections 31, 32. In some embodiments, step 1012 may be omitted from the method 1000.

An optional step 1014 of forming holes 35 in segments 33 used to provide the core 34 may be included in method 1000 as shown in FIG. 7. These holes may be formed by drilling, machining, or may be formed during molding of the segments 33. These holes 35 are later filled with nanocrystalline coating to form reinforcement pins 372 as shown in FIG. 3B. In some embodiments, reinforcement pins 372 may be inserted into holes 35 or pushed into core 34 and then bonded to shell 36 during coating of the core 34.

In a step 1016, the assembled segments 33 are coated with nanocrystalline metallic material coating to form shell 36 as shown in FIGS. 6 and 7. Reinforcement pins 372 may be formed during this step in some embodiments in which the segments 33 include holes 35.

An optional step 1018 of removing the core 34 may be included in the method 1000 as shown in FIG. 7. The core 34 is illustratively removed by heating the sections 31, 32 to melt or burn the polymeric material of the core 34. In these embodiments, a hollow interior space 270, 370 is formed by the shell 36 after step 1018.

Another optional step 1020 of filling the hollow interior space 270, 370 with foam filler 271, 371 may be included in the method 1000 as shown in FIG. 7. The foam filler 271, 371 may be blown or injected in a liquid form and may set up within the interior space 270, 370 of the shell 36 to solidify a band 210, 310.

In a final step 1022 of the method 1000, the sections 31, 32 of a band 10, 110, 210, 310 are assembled to form a full ring around the central axis 11 as shown in FIGS. 6 and 7. The sections 31, 32 are illustratively assembled by inserting a male feature 61, 161 into a female feature 62, 162 as suggested in FIGS. 4A, 4B, 5A, 5B. Adhesives, welds, or brazes may also be used to fix the sections 31, 32 to one another. In embodiments where the band is a one-piece full hoop without sections, step 1022 is omitted.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A band for supporting a variable position vane within a gas turbine engine, the band comprising
a core comprising polymeric materials,
reinforcement pins that extend through an internal cavity of the core, and
a shell comprising nanocrystalline metallic materials applied to the core to cover an outer surface of the core and form the reinforcement pins.

2. The band of claim 1, wherein the polymeric material comprised by the core is selected from a group consisting of polyether ether ketone, acrylonitrile butadiene styrene, polyethylenimine, and Nylon GF.

3. The band of claim 1, wherein the nanocrystalline material comprised by the shell is a nickel-based alloy.

4. The band of claim 1, wherein the band is arcuate and extends at least partway around a central axis and a thickness of the shell is greater along a radially-outward facing flow path surface of the band than along other surfaces of the band.

5. The band of claim 4, wherein the band is formed to include a plurality of holes that extend inward in a radial direction from the radially-outward facing flow path surface toward the central axis.

6. The band of claim 5, wherein the holes are blind holes that extend partway through the band.

7. A band for supporting a variable position vane within gas turbine engine, the band comprising
a shell that forms at least a portion of an arc around a central axis and that defines an internal cavity,
the band is formed to include a plurality of blind holes that extend inward in a radial direction from a radially-outward facing flow path surface toward the central axis, and
reinforcement pins that extend through the internal cavity, wherein the shell and the reinforcement pins comprise nanocrystalline metallic materials.

8. The band of claim 7, wherein the internal cavity is hollow.

9. The band of claim 7, wherein a thickness of the shell is greater along the radially-outward facing flow path surface of the band than along other surfaces of the band.

10. A method of making a band for supporting a variable position vane within gas turbine engine, the method comprising
molding a first polymeric core having an arcuate shape that extends around a central axis, forming holes in the first polymeric core that extend through the first polymeric core, and coating the first polymeric core with nanocrystalline metallic materials to form a shell over the first polymeric core so that reinforcement pins comprising nanocrystalline metallic materials are created during coating of the first polymeric core with nanocrystalline metallic materials to form the shell.

11. The method of claim 10, further comprising assembling a second polymeric core to the first polymeric core before coating the first and the second polymeric core so that the shell is formed over both the first and the second polymeric core.

12. The method of claim 10, further comprising removing the first polymeric core after the shell is formed to create a hollow internal cavity defined by the shell.

13. The method of claim 12, wherein removing the first polymeric core is accomplished by heating the polymeric core and the shell.

14. The method of claim 10, further comprising removing the first polymeric core after the shell is formed to create an internal cavity defined by the shell through which the reinforcement pins extend.

15. The method of claim 10, wherein a thickness of the shell is greater along a radially-outward facing flow path surface of the band than along other surfaces of the polymeric core.

* * * * *